United States Patent
Fienblit et al.

(10) Patent No.: US 8,572,137 B2
(45) Date of Patent: Oct. 29, 2013

(54) DATA DE-DUPLICATION IN A DISTRIBUTED NETWORK

(75) Inventors: Shachar Fienblit, Haifa (IL); Itzhack Goldberg, Haifa (IL); Evgeny Schmeilin, Haifa (IL); Aviad Zlotnick, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 12/555,703

(22) Filed: Sep. 8, 2009

(65) Prior Publication Data

US 2011/0060759 A1    Mar. 10, 2011

(51) Int. Cl.
G06F 17/30    (2006.01)

(52) U.S. Cl.
USPC ............. 707/827; 711/161; 711/162; 714/57

(58) Field of Classification Search
None
See application file for complete search history.

(56) References Cited

U.S. PATENT DOCUMENTS

| | | |
|---|---|---|
| 6,253,240 B1 | 6/2001 | Axberg et al. |
| 6,968,085 B2 | 11/2005 | Bern |
| 7,092,956 B2 | 8/2006 | Ruediger |
| 2005/0027718 A1* | 2/2005 | Sakaguchi et al. ............ 707/100 |
| 2005/0228856 A1* | 10/2005 | Swildens et al. .............. 709/200 |
| 2005/0232046 A1 | 10/2005 | Mamou et al. |
| 2009/0182789 A1* | 7/2009 | Sandorfi et al. ............... 707/204 |
| 2010/0094817 A1* | 4/2010 | Ben-Shaul et al. ........... 707/697 |
| 2010/0161554 A1* | 6/2010 | Datuashvili et al. .......... 707/610 |
| 2010/0223495 A1* | 9/2010 | Leppard .......................... 714/6 |

FOREIGN PATENT DOCUMENTS

GB    2300937 A   * 11/1996

OTHER PUBLICATIONS

Michael Spiz, "Using Latent Semantic Indexing for Data Deduplication", Master Thesis submitted to University of Washington, 2006. Source URL—www.tacoma.washington.edu/tech/docs/research/gradresearch/MSpiz.pdf.
Phillip Russom, "Complex Data: A New Challenge for Data Integration", TDWi research, The Data Warehousing institute, Nov. 2007, TDWI Monograph. Source URL—www.informatica.com/INFA_Resources/wp_tdwi_monograph_complexdata_Nov2007.pdf.
Rainer Uhle, "SAP Netweaver 7—Business Intelligence Warehouse Management", 2007 Source URL—www.tacook.co.uk/media/pdf/00075_pre3.pdf.

* cited by examiner

Primary Examiner — Anh Tai Tran
(74) Attorney, Agent, or Firm — Griffiths & Seaton PLLC

(57) ABSTRACT

A computer-implemented method for efficient data storage is provided. A first storage medium associates data stored on one or more data storage media with a unique identification value (ID) for the purpose of determining de-duplication status of the data. In response to receiving a request to read the data from a logical address, the first storage medium retrieves the data from a second storage medium based on the unique ID. In response to receiving a request to write the data to a logical address, the one or more data storage media store at least one copy of the data based on the de-duplication status of the data.

24 Claims, 6 Drawing Sheets

DATA DE-DUPLICATION IN A DISTRIBUTED NETWORK

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to data storage servers and, more particularly, to data de-duplication in a distributed network.

BACKGROUND

A data storage server may implement data de-duplication to prevent or eliminate multiple copies of the same data from being stored in the storage server. Unfortunately, existing implementations fail to support data de-duplication in a distributed network comprising multiple storage servers.

Moreover, if there are a large number of users in the distributed network, availability of data may be reduced and performance may be negatively impacted. Availability of data may be reduced, for example, if data is stored in a storage server that is non-operational. Performance may be negatively impacted, for example, if data is stored in storage server that is located remotely from a user requesting the data or if a large amount of data is stored in a storage server that is overloaded with data requests.

SUMMARY

The present disclosure is directed to systems and corresponding methods that facilitate data de-duplication in a distributed network.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a computer-implemented method for reading data in a distributed network is provided. A first storage medium in the distributed network receives a request from a client to read the data from a logical address; retrieves the data from a second storage medium in the distributed network using a unique identification (ID) of the data; and forwards the data to the client. The unique ID of the data is associated with the logical address of the data.

In accordance with one embodiment, a computer-implemented method for writing data in a distributed network is provided. A first storage medium in the distributed network receives a request from a client to write a first copy of the data to a logical address; determines whether at least a second copy of the data is already stored in one or more storage media in the distributed network; and stores the data in the first storage medium, in response to failing to find at least the second copy of the data. The first copy of the data is not stored in the first storage medium, in response to finding at least the second copy of the data.

In accordance with one embodiment, a computer-implemented method for de-duplication of data in a distributed network is provided. A first de-duplication manager (DDM) in the distributed network receives at least a unique ID of the data and a network address of a first storage medium in which the data is stored; locates one or more storage media in the distributed network in which the data is stored using the unique ID of the data; determines whether there is more than a predetermined threshold number of copies of the data; and removes the data from a second storage medium selected from among the one or more storage media. The unique ID of the data is associated with network addresses of the one or more storage media.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other recited aspects. The level of detail associated with each of the elements or features should not be construed to qualify the novelty or importance of one feature over the others.

In one or more of the embodiments provided below, a storage server may associate data with a unique ID for the purpose of determining de-duplication status of the data. The de-duplication status indicates a relationship between number of copies of the data and a predetermined threshold value. The unique ID of the data may be associated with a logical address of the data, a physical address of the data, a network address of a storage server in which the data is stored, or a combination thereof.

In response to receiving a request to read the data from a logical address, a storage server may use the network address associated with the unique ID to locate a storage server in which the data is stored. The storage server storing the data may use the physical address associated with the unique ID may to retrieve the data from memory. In response to receiving a request to write the data to a logical address, a storage server may store the data such that the number of copies of the data is less than or equal to the predetermined threshold value.

Figure 1:
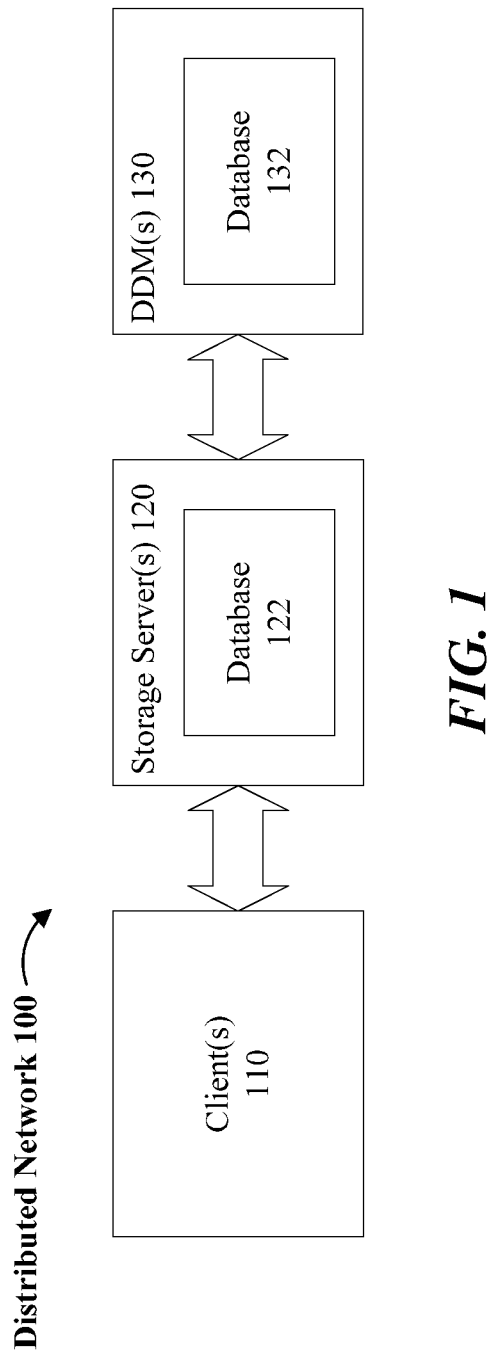
FIG. 1 illustrates an exemplary distributed network, in accordance with one or more embodiments.

Referring to FIG. 1, in accordance with one or more embodiments, an exemplary distributed network 100 may comprise one or more clients 110, one or more storage servers 120, and one or more de-duplication managers (DDM) 130.

Each client 110 may be an application, device, or other entity capable of forwarding requests to read or write data to a storage server 120. Each storage server 120 may be a file system, a network-attached storage (NAS), a storage area network (SAN), or other storage means shared by one or more of the clients 110. Each de-duplication manager 130 may be a software component, a hardware component, or a combination of software or hardware components shared by one or more of the storage servers 120.

In one embodiment, each storage server 120 comprises a database 122 for associating the unique identification (ID) of a particular data with the location of the data in the storage server 120 (i.e., the physical address of the data). For example, if the unique ID of the data is referred to as Q and the physical address of the data is referred to as L, the database 122 may store the association <Q, L>. The unique ID may be used to identify duplicate copies of the data since duplicate copies of data have the same unique ID.

The storage server 120 may also associate the location of the data in the distributed network 100 (i.e., the logical address of the data) with the unique ID of the data and the location of a storage server 120 in the distributed network 100 (i.e., the network address of the storage server 120) in the database 122. For example, if the logical address of the data is referred to as K and the network address of the storage server 120 is referred to as S, the database 122 may store the association <K, Q, S>.

Each DDM 130 comprises a database 132 for associating the logical address of a particular data with the unique ID of the data and the network address of the storage server 120. For example, if the logical address of the data is K, the unique ID of the data is referred to as Q, and the network address of the storage server 120 is referred to as S, the database 122 may store the association <K, Q, S>.

Alternatively, each DDM 130 comprises a database 132 for associating the unique ID of a particular data with the network address of a storage server 120, without including the logical address of the data. For example, if the unique ID of the data is referred to as Q and the network address of the storage server 120 is referred to as S, the database 122 may store the association <Q, S>.

Depending on implementation, each data stored in a storage server 120 may be a default size or a custom size defined by the storage server 120. Thus, unique IDs may be respectively associated with data of various sizes. Desirably, unique IDs are computed as hash values and the databases 122 or 132 are implemented as hash tables or hash maps, so that the storage servers 120 may using the unique IDs to search for associations in amortized constant time. It should be understood, however, that other search methodologies (e.g., a binary search tree) may be utilized to achieve the same purpose.

To enhance security, a DDM 130 may divide data into multiple parts and store each part in a different storage server 120. In one implementation, for example, a storage server 120 ("server A") may store a first half of the data, and a storage server 120 ("server B") may store a second half of the data. In such an implementation, security is enhanced because a user who obtains control of server A may not access the second half of the data in server B.

With respect to billing for storage services, a service provider may bill a user based on block-size, popularity, or performance. For example, the service provider may bill more if the data is large. Or, the service provider may bill less if the data is frequently accessed since the overhead cost for providing the data is divided among a plurality of accesses, for example. The service provider may further bill a user according to performance requirements defined in a quality of service (QoS) agreement, for example.

Figure 2:
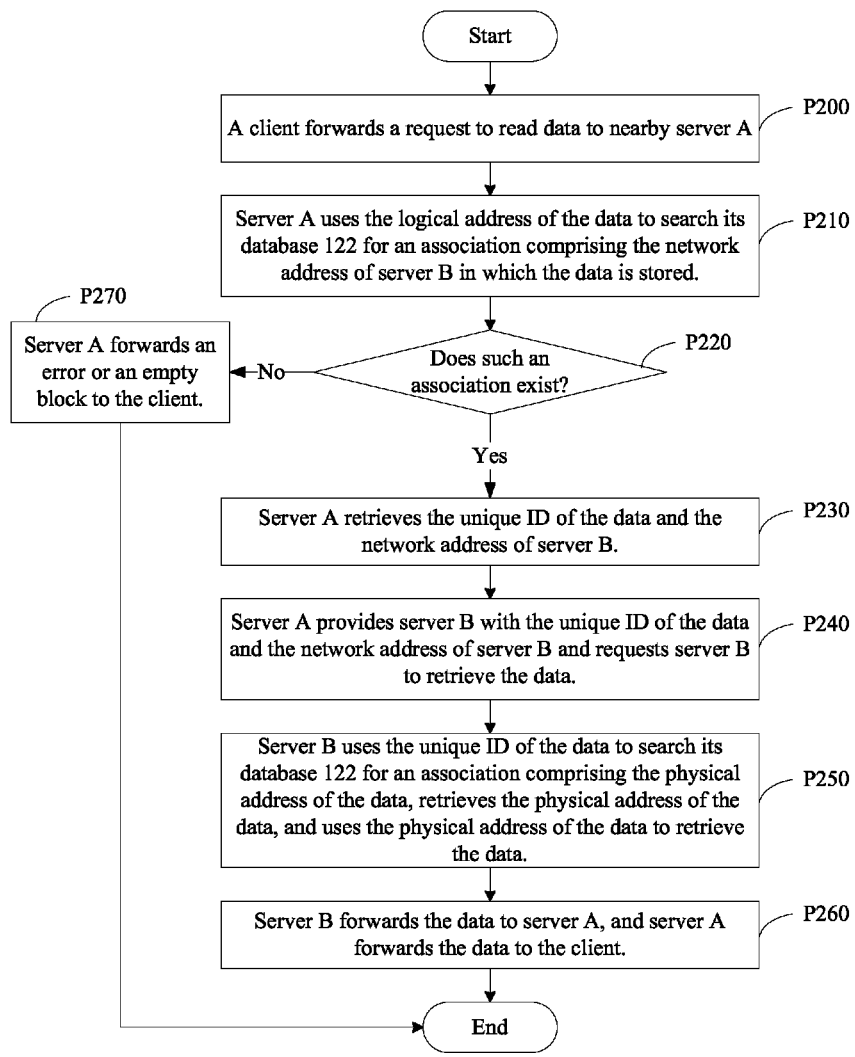
FIG. 2 is a flow diagram of a method for reading data in a distributed network, in accordance with one embodiment.

Referring to FIGS. 1 and 2, in accordance with one embodiment, a client 110 forwards a request to read data to a storage server 120 that is local or in close proximity to (i.e., nearby) the client 110 ("server A") (P200). The request comprises a logical address from which to read the data. Upon receiving the request, server A uses the logical address of the data to search its database 122 for an association comprising the network address of a storage server 120 in which the data is stored ("server B") (P210).

If such an association is found (P220), server A retrieves the unique ID of the data and the network address of server B from the database 122 (P230). Upon retrieving the unique ID of the data and the network address of server B, server A provides server B with the unique ID of the data and requests server B to retrieve the data (P240). Server B may be identical to server A. In such a scenario, some processes may not be performed over an external network.

Server B uses the unique ID of the data to search its database 122 for an association comprising the physical address of the data, retrieves the physical address of the data from the database 122, and uses the physical address of the data to retrieve the data (P250). Once the data is retrieved, server B forwards the data to server A, and server A forwards the data to the client 110 (P260).

If an association comprising the logical address of the data is not found in server A's database 122 (P220), server A forwards an error or an empty block to the client 110 (P270). It is noteworthy that server B may refer to server A or to another storage server 120 in the distributed network 100. If server B refers to server A, one or more of the processes described above may be unnecessary.

Figure 3:
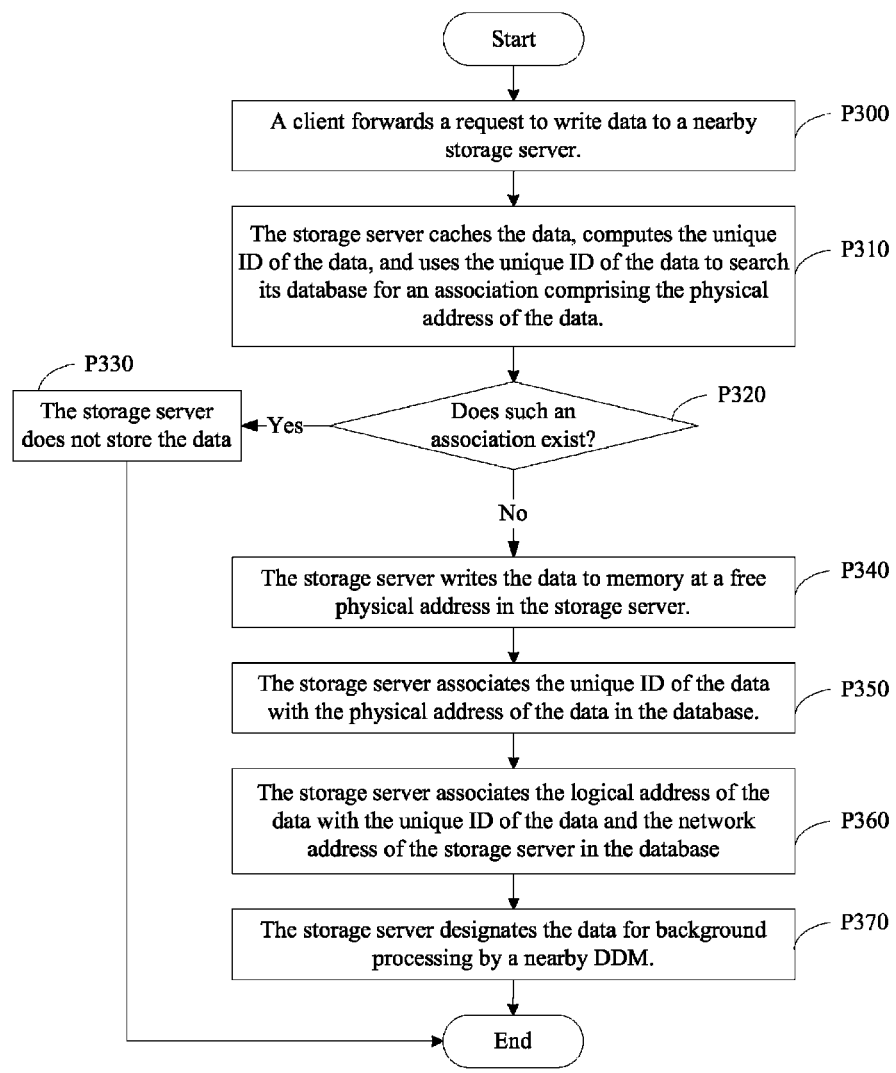
FIG. 3 is a flow diagram of an exemplary method for writing data in a distributed network, in accordance with one embodiment.

Referring to FIGS. 1 and 3, in accordance with one embodiment, a client 110 forwards a request to write data to a nearby storage server 120 (P300). The request comprises a logical address to which to write the data. Upon receiving the request, the storage server 120 computes the unique ID of the data and uses the unique ID of the data to search its database 122 for an association comprising the physical address of the data (P310).

If such an association is found (P320), the storage server 120 does not store the data because the data is already stored in the distributed network 100 (P330). Otherwise, the data is written to memory at a free physical address in the storage server 120 (P340). Once the data is written, the unique ID of the data is associated with the physical address of the data in the database 122 (P350). Additionally, the logical address of the data is associated with the unique ID of the data and the network address of the storage server 120 in the database 122 (P360).

Upon storing the data and updating its database 122, the storage server 120 designates the data for background processing by a nearby DDM 130 (P370). In one implementation, for example, an association comprising at least the unique ID of the data and the network address of the storage server 120 is added to a queue at the DDM 130.

In one embodiment, the background processing may comprise removing the data from the storage server 120 or another storage server 120, in response to finding more than one copy of the data in the distributed network 100. The DDM 130 may allow multiple copies of the data to exist in the distributed network 100 to prevent reduced availability of the data due to storage failure or performance bottlenecks caused by frequent requests to the same storage server 120. However, the number of copies may be limited to a certain amount in order to substantially preserve the storage consumption savings attributed to complete data de-duplication (i.e., storing a single copy of the data). In one implementation, for example, the number of copies may be determined according to a QoS agreement.

Figure 4:
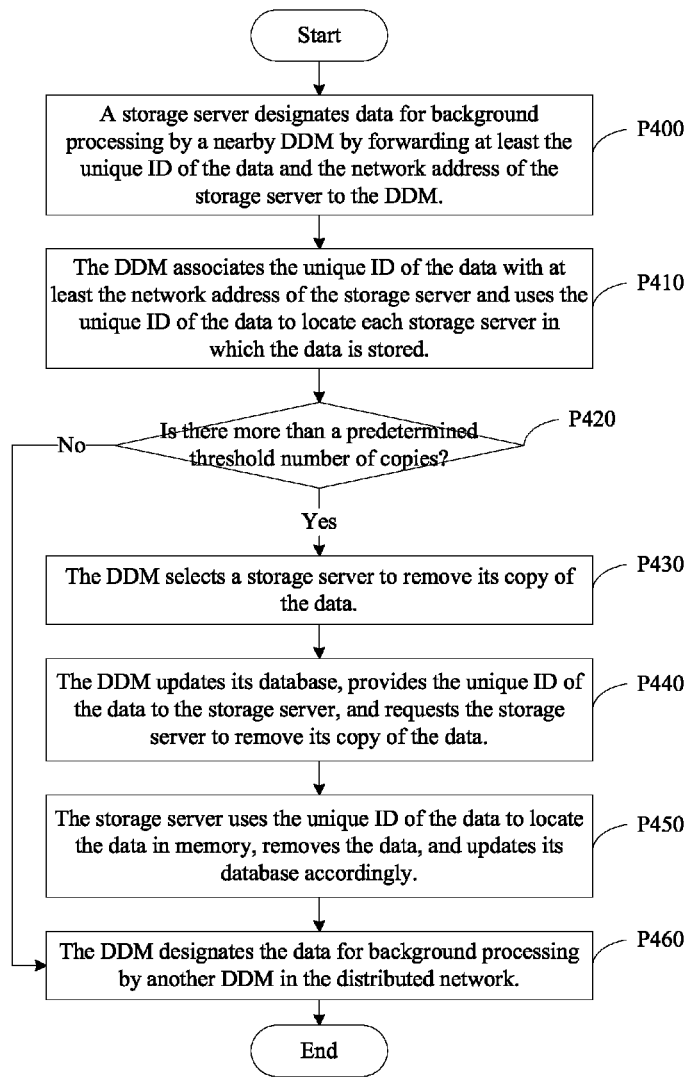
FIG. 4 is a flow diagram of a method for de-duplication of data in a distributed network, in accordance with one embodiment.

Referring to FIGS. 1 and 4, in accordance with one embodiment, a DDM 130 may perform background processing on data to eliminate undesired copies of the data from the distributed network 100. Upon storing data, a storage server 120 designates the data for background processing by a nearby DDM 130 by forwarding at least the unique ID of the data and the network address of the storage server 120 to the DDM 130 (P400).

In response to receiving at least the unique ID of the data and the network address of the storage server 120, the DDM 130 associates the unique ID of the data with at least the network address of the storage server 120 in its database 132 (P410). In one implementation, the DDM 130 may also receive the logical address of the data stored in the storage server 120 and associate the unique ID of the data with the logical address of the data, in addition to the network address of the storage server 120.

The DDM 130 uses the unique ID of the data to locate each storage server 120 in which the data is stored (P410). That is, the DDM 130 uses the unique ID of the data to search its database 132 for associations comprising network addresses of storage servers 120 in which the data is stored. It is noteworthy that at least the association added to the database 132 in process P410 is returned by the search.

If there is more than a predetermined threshold number of copies of the data (e.g., a single copy or a limited number of copies) in the distributed network 100 (P420), the DDM 130 selects a storage server 120 to remove its copy of the data (P430). Depending on implementation, the DDM 130 may select a storage server 120 according to a dynamic evaluation based on factors related to affinity, frequency of use, price of storage, estimated risk of failure, etc. In one implementation, for example, the DDM 130 may select a storage server 120 that is furthest from a client 110 that frequently accesses the data.

Once a storage server 120 is selected to remove its copy of the data, the DDM 130 updates its database 132 by removing the association comprising the network address of the storage server 120 from the database 132 (P440). The DDM 130 also provides the unique ID of the data to the storage server 120 and requests the storage server 120 to remove its copy of the data (P440).

In response to the request, the storage server 120 uses the unique ID of the data to locate the data in memory and removes the data (P450). That is, the storage server 120 uses the unique ID of the data to search its database 122 for an association comprising the physical address of the data. Upon finding the association, the storage server 120 retrieves the physical address of the data and frees memory at the physical address of the data.

Upon removing the data, the storage server 120 updates its database 122 accordingly (P450). That is, the storage server 120 removes the association comprising the network address of the storage server and the association comprising the physical address of the data from its database 122.

Once the number of copies of the data in the distributed network 100 is less than or equal to the predetermined threshold, the DDM 130 may optionally designate the data for background processing by another DDM 130 in the distributed network 100 (P460).

In different embodiments, the claimed subject matter may be implemented either entirely in the form of hardware or entirely in the form of software, or a combination of both hardware and software elements. For example, each of the clients 110, the storage servers 120, or the DDMs 130 may be included in a controlled computing system environment that may be presented largely in terms of hardware components and software code executed to perform processes that achieve the results contemplated by the system of the claimed subject matter.

Figure 5:
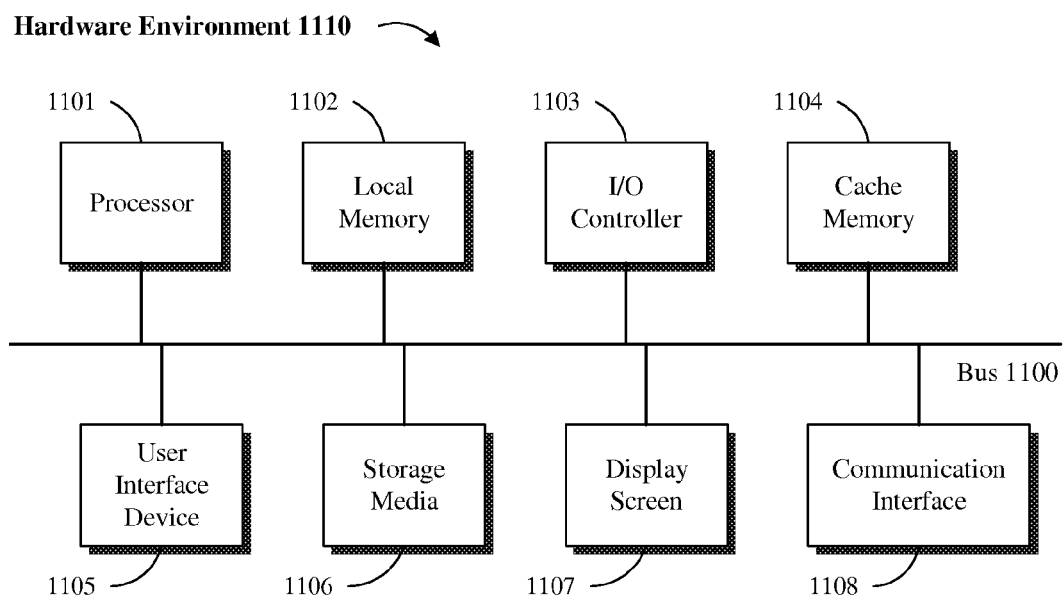
FIGS. 5 and 6 are block diagrams of hardware and software environments in which a system of the present invention may operate, in accordance with one or more embodiments.
Figure 6:
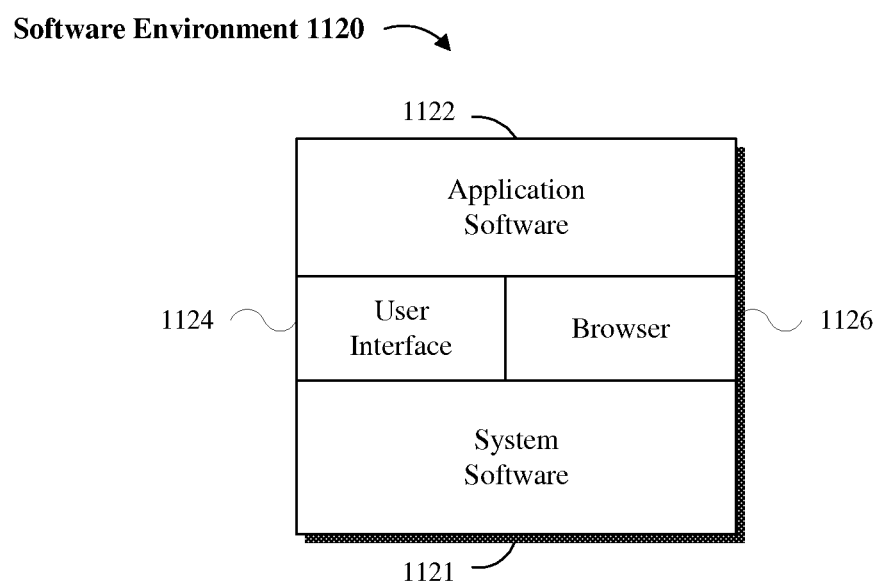

Referring to FIGS. 1, 5, and 6, a computing system environment in accordance with an exemplary embodiment is composed of a hardware environment 1110 and a software environment 1130. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1130 is divided into two major classes comprising system software 1121 and application software 1132. System software 1121 comprises control programs, such as the operating system (OS) and information management systems that instruct the hardware how to function and process information.

In one embodiment, each storage server 120 or DDM 130 is implemented as application software 1132 executed on one or more hardware environments to facilitate efficient data de-duplication in the distributed network 100. Application software 1132 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 5, an embodiment of the application software 1132 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable client embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 6, application software 1132 may comprise one or more computer programs that are executed on top of system software 1121 after being loaded from storage media 1106 into local memory 1102. In a client-server architecture, application software 1132 may comprise client software and server software. For example, in one embodiment, client software is executed on the clients 110 and server software is executed on the service provider 130 or the servers 130.

Software environment 1130 may also comprise browser software 1126 for accessing data available over local or remote computing networks. Further, software environment 1130 may comprise a user interface 1124 (e.g., a Graphical User Interface (GUI)) for receiving user commands and data.

Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter and are further defined by the claims and their full scope of equivalents.

What is claimed is:

1. A computer-implemented method for de-duplication of data in a distributed network, the method comprising:
   receiving, by a first de-duplication manager (DDM) in the distributed network, at least a unique identification (ID) of the data and a network address of a first storage medium in which the data is stored;
   locating one or more storage media in the distributed network in which the data is stored using an association of the unique ID of the data and one or more physical addresses where the data is stored, wherein a logical address of the data is associated with network addresses of the one or more storage media;
   determining, via the association, if there is more than a predetermined threshold number of copies of the data; and
   if there is more than the predetermined threshold number of copies of the data:
   selecting one or more copies of the data for removal, and
   removing the selected one or more copies of the data from a second storage medium selected from among the one or more storage media, wherein selecting the one or more copies comprises selecting the one or more copies of the data that are furthest from a client that frequently accesses the data.

2. The method of claim 1, wherein the second storage medium is selected according to a dynamic evaluation based on at least one of affinity, frequency of use, price of storage, or estimated risk of failure.

3. The method of claim 1, wherein the removing comprises providing the unique ID of the data to the second storage medium and requesting the second storage medium to remove the data.

4. The method of claim 1, wherein the second storage medium uses the unique ID of the data to locate the data in memory and removes the data.

5. The method of claim 1, further comprising adding a first association comprising at least the unique ID of the data and the network address of the first storage medium to a first database.

6. The method of claim 5, further comprising removing a second association comprising at least the unique ID of the data and the network address of the second storage medium from the first database.

7. The method of claim 1, wherein the second storage medium removes an association comprising the unique ID of the data and a physical address of the data in the second storage medium is removed from a second database.

8. The method of claim 7, wherein the second storage medium removes an association comprising the unique ID of the data, a logical address of the data, and the network address of the second storage medium from the second database.

9. The method of claim 1, further comprising designating the data for background processing by a second DDM in the distributed network.

10. A system for de-duplication of data in a distributed network, comprising:
   a processor; and
   a memory coupled to the processor, wherein the memory stores computer code that, when executed by the processor, cause the processor to:
      receive, by a first de-duplication manager (DDM) in the distributed network, at least a unique identification (ID) of the data and a network address of a first storage medium in which the data is stored,
      locate one or more storage media in the distributed network in which the data is stored using an association of the unique ID of the data and one or more physical addresses where the data is stored, wherein a logical address of the data is associated with network addresses of the one or more storage media;
      determine, via the association, if there is more than a predetermined threshold number of copies of the data, and
      if there is more than the predetermined threshold number of copies of the data:
         select one or more copies of the data for removal, and
         remove the selected one or more copies of the data from a second storage medium selected from among the one or more storage media, wherein selecting the one or more copies comprises selecting the one or more copies of the data that are furthest from a client that frequently accesses the data.

11. The system of claim 10, wherein the second storage medium is selected according to a dynamic evaluation based on at least one of affinity, frequency of use, price of storage, or estimated risk of failure.

12. The system of claim 10, wherein, when removing the selected one or more copies of the data, the processor is configured to provide the unique ID of the data to the second storage medium and requesting the second storage medium to remove the data.

13. The system of claim 10, wherein the second storage medium uses the unique ID of the data to locate the data in the memory and remove the data.

14. The system of claim 10, wherein the processor is further configured to add a first association comprising at least the unique ID of the data and the network address of the first storage medium to a first database.

15. The system of claim 14, wherein the processor is further configured to remove a second association comprising at least the unique ID of the data and the network address of the second storage medium from the first database.

16. The system of claim 10, wherein the second storage medium removes an association comprising the unique ID of the data and a physical address of the data in the second storage medium is removed from a second database.

17. The system of claim 16, wherein the second storage medium removes an association comprising the unique ID of the data, a logical address of the data, and the network address of the second storage medium from the second database.

18. The system of claim 10, wherein the processor is further configured to designate the data for background processing by a second DDM in the distributed network.

19. A physical computer storage memory comprising a computer program product method for de-duplication of data in a distributed network, the physical computer storage memory comprising:
   computer code for receiving, by a first de-duplication manager (DDM) in the distributed network, at least a unique identification (ID) of the data and a network address of a first storage medium in which the data is stored;
   computer code for locating one or more storage media in the distributed network in which the data is stored using an association of the unique ID of the data and one or more physical addresses where the data is stored, wherein a logical address of the data is associated with network addresses of the one or more storage media;
   computer code for determining, via the association, if there is more than a predetermined threshold number of copies of the data; and
   if there is more than the predetermined threshold number of copies of the data:
      computer code for selecting one or more copies of the data for removal, and
      computer code for removing the selected one or more copies of the data from a second storage medium selected from among the one or more storage media, wherein selecting the one or more copies comprises selecting the one or more copies of the data that are furthest from a client that frequently accesses the data.

20. The physical computer storage memory of claim 19, wherein the second storage medium is selected according to a dynamic evaluation based on at least one of affinity, frequency of use, price of storage, or estimated risk of failure.

21. The physical computer storage memory of claim 19, wherein the removing comprises providing the unique ID of the data to the second storage medium and requesting the second storage medium to remove the data.

22. The physical computer storage memory of claim 19, wherein the second storage medium uses the unique ID of the data to locate the data in memory and removes the data.

23. The physical computer storage memory of claim 19, further comprising computer code for adding a first association comprising at least the unique ID of the data and the network address of the first storage medium to a first database.

24. The physical computer storage memory of claim 19, wherein the second storage medium removes an association comprising the unique ID of the data and a physical address of the data in the second storage medium is removed from a second database.

* * * * *